(12) United States Patent
Mordaunt

(10) Patent No.: US 11,708,541 B2
(45) Date of Patent: Jul. 25, 2023

(54) BICYCLE LUBRICANT

(71) Applicant: Alexander Mordaunt, Los Gatos, CA (US)

(72) Inventor: Alexander Mordaunt, Los Gatos, CA (US)

(*) Notice: Subject to any disclaimer, the term of this patent is extended or adjusted under 35 U.S.C. 154(b) by 0 days.

(21) Appl. No.: 16/595,672

(22) Filed: Oct. 8, 2019

(65) Prior Publication Data

US 2021/0102139 A1    Apr. 8, 2021

(51) Int. Cl.
| | | |
|---|---|---|
| *C10M 169/02* | (2006.01) | |
| *C10M 101/02* | (2006.01) | |
| *C10M 113/08* | (2006.01) | |
| *F16H 57/04* | (2010.01) | |
| *F16H 57/05* | (2006.01) | |
| *F16N 15/00* | (2006.01) | |
| *F16G 13/02* | (2006.01) | |
| *B62M 9/00* | (2006.01) | |
| *C10N 40/00* | (2006.01) | |
| *C10N 50/10* | (2006.01) | |

(52) U.S. Cl.
CPC ........ *C10M 169/02* (2013.01); *C10M 101/02* (2013.01); *C10M 101/025* (2013.01); *C10M 113/08* (2013.01); *F16G 13/02* (2013.01); *F16H 57/041* (2013.01); *F16H 57/05* (2013.01); *F16N 15/00* (2013.01); *B62M 9/00* (2013.01); *C10M 2201/0666* (2013.01); *C10M 2203/1006* (2013.01); *C10M 2203/1025* (2013.01); *C10N 2040/38* (2020.05); *C10N 2050/10* (2013.01); *F16N 2210/33* (2013.01)

(58) Field of Classification Search
CPC ............ C10M 169/02; C10M 101/025; C10M 101/02; C10M 113/08; C10M 2203/1006; C10M 2203/1025; C10M 2201/0666; F16G 13/02; F16H 57/041; F16H 57/05; F16N 15/00; F16N 2210/33; C10N 2040/38; C10N 2050/10; B62M 9/00
USPC ....................................................... 508/167
See application file for complete search history.

(56) References Cited

U.S. PATENT DOCUMENTS 3,607,746 A * 9/1971 Caruso .................. C10M 7/00
508/167

* cited by examiner

*Primary Examiner* — Prem C Singh
*Assistant Examiner* — Francis C Campanell
(74) *Attorney, Agent, or Firm* — Schmidt Patent Law, Inc.

(57) ABSTRACT

A bicycle chain lubricant that may be applied as a coating on a bicycle chain is a crystalline solid at ambient temperatures, yet when the chain is in motion the forces around internal components locally transforms the coating to a lubricous fluid. This increases chain efficiency in the drive train and reduces ware by limiting water and dirt access to chain internal components.

15 Claims, 4 Drawing Sheets

BICYCLE LUBRICANT

FIELD OF THE INVENTION

The invention relates generally to lubricants for chain drives, and particularly to lubricants for bicycle and motorcycle chains.

BACKGROUND

Bicycles and motorcycles have chains that transfer power from a rotating source to the rear wheels. These chains are classified as roller chains containing a series of pins, links with cylindrical holes and side plates, or a combination thereof. Corrosion caused by water and abrasion by dirt are the main sources of wear, which is attributed to removal of material increasing the hole size in the links and reducing the pin diameter thus creating a mismatch between an elongated chain and the teeth in a sprocket. Furthermore, friction is increased with the roughening of contact surfaces.

Roller chains require lubricants to reduce friction between moving parts and lessen chain wear. These chains need regular cleaning because of dirt contamination of the lubricants that becomes abrasive, and reapplication of clean lubricant. This is particularly relevant on bicycles (or motorcycles) used in dirt water and mud off road environments, such as mountain biking. Lubricants disclosed in the prior art are categorized as fluid and solid, which are often referred to as wet and dry respectively.

Fluid lubricants including oils and greases are often used. Fluid lubricants coat the chain including internal pins and plate surfaces. Fluid lubricant occupies the internal spaces of the chain and are hydrophobic preventing water gaining internal access. Unfortunately, when dirt comes in contact with the fluid lubricant, it can stick and become trapped forming an abrasive gel suspension of dirt particles in the fluid.

Paraffin wax is used as a lubricant. Chemically it is a solid crystalline mixture of straight-chain alkane hydrocarbons ranging from n-eiscosane ($C_{20}H_{42}$) to n-hexatriacontane ($C_{36}H_{74}$), with melting points of 37° C. and 75° C. respectively. The longer alkanes have higher melting points than the shorter ones, hence the melting point of a paraffin wax is determined by the mixture of hydrocarbon composition, typically ranging from 46° C.-68° C. A roller chain does not create much heat (less than 3° C. increase at a moderate race pace at localized points of friction) as the chain has a large thermal mass and is air cooled as the chain moves. Given the large temperature difference between the operational temperature of the lubricant and the melting point, paraffin wax is a solid lubricant.

Generally solid lubricants, often containing wax or Teflon, are applied in a molten form or in a mixture with a volatile liquid that evaporates subsequent to application. Solid lubricants occupy the internal spaces between the chain components. This limits dirt gaining internal access, resulting in a low dirt contamination. However, smaller water molecules can find their way into the internal workings of a moving chain, despite the hydrophobic nature of the wax.

Greases are characterized by their shear thinning properties, the non-Newtonian behavior of fluids whose viscosity decreases under shear stress. At rest in ambient temperatures, greases are high viscosity fluids that may be a deformable gel-solid. Upon the application of shear forces the viscosity is lowered resulting in liquid-like behavior and lubrication. Grease generally consists of a soap emulsified with petroleum oil with some additives. U.S. Pat. Nos. 1,222,128, 2,320,002; and 2,534,053 describe lubricating greases comprising petroleum oil, paraffin wax and fatty acid derived soaps all in the fluid state at ambient temperatures.

Petroleum oils (also known as mineral oil) are alkane molecules ranging from pentane to pentadecane and include straight-chain, branched-chain and cyclo-alkane molecules. Cyclo-alkanes are generally not desirable in lubricants. Paraffinic oils (also known as liquid paraffin) are highly refined petroleum oils exclusively comprising straight chain hydrocarbon structures.

U.S. Pat. No. 3,635,849 disclosed a composition mixture of petroleum oil, paraffin wax and polyisobutylene (butyl rubber) to form a non-Newtonian (thixotropic) time dependent viscosity fluid which is resistant to instantaneous forces and conforms to slow or constant pressure. Likewise, U.S. Pat. Nos. 2,320,002, 2,836,562 teach a thixotropic formulation of petroleum jelly fluid which is a mixture of petroleum oil, paraffin wax and aluminum soap mixture that has a viscosity below that of the pure oil. Similarly, U.S. Pat. No. 2,662,058 discloses a thixotropic mixture of petroleum oil, paraffin wax and aliphatic organic nitrogen compounds with the advantage that oil has less tendency to separate than the mixtures using emulsified soap.

U.S. Pat. No. 2,951,028 describes a blend of medium chain and long chain paraffin waxes with melting point ranges of 52-56° C. and 59-64° C. that results in a compounded mixture that has greater resistance to water penetration than the individual original waxes.

There are large number of patents: U.S. Pat. Nos. 1,954,659, 1,958,462, 2,159,218, 2,825,635, 3,046,101, 4,255,098, 5,171,329, 6,214,918, 6,284,007 and 6,730,137, that teach candles made from a mixture of paraffin wax and vegetable oil or animal fats. The ratio of these two components and the use of additional components effect the candle characteristics such as stability at room temperature, smooth texture, water repellent, low odor and reactivity.

Furthermore, it is known that molybdenum disulfide ($MoS_2$) powder is a good solid lubricant. U.S. Pat. No. 4,673,597 discloses that adding metallic gallium, gallium alloys or $MoS_2$ to paraffin wax to lower the melting point. Specifically, a mixture by weight of 30% $MoS_2$ with 70% paraffin wax can be softened when warmed, so that it can be conveniently applied to the ski base. Both this mixture and pure $MoS_2$ have been shown to increase the speed of skiers on snow compared to the use of standard paraffin wax.

U.S. Pat. No. 3,281,362 discloses a composition mixture by weight of 2% to 15% wax and 85+% $MoS_2$ powder created a lubricating film resistant to water penetration. Kozbial et al [1] report that $MoS_2$ in the presence of wax is hydrophobic effecting contact angle and slide angle.

Reference: Kozbial A, Gong X, Liu H, Li L, Understanding the Intrinsic Water Wettability of Molybdenum Disulfide, Langmuir 2015, Vol 31 8429-8435

SUMMARY

The inventor has discovered and optimized the design for a bicycle chain lubricant compound that coats the chain. It is a crystalline solid at ambient temperature yet when the chain is in motion the forces around internal components locally transform the coating into a lubricous shear thinning fluid as shear stress is applied. In solid form the external coating repels dirt and water and as a fluid the coating lubricates moving parts and further repels water from accessing the internals of the chain. These characteristics provide long lubricant durability, low-wear and low-friction performance compared to lubricants in the prior art.

In one aspect, the coating compound comprises, consists essentially of, or consists of a mixture of a petroleum oil (oil), paraffin wax (wax) and $MoS_2$, hereto abbreviated to oil-wax-$MoS_2$. The main component of the compound is wax. Oil is added to form an oil-wax matrix with 10%-20% $MoS_2$ concentration by weight. The mixture of these three compounds is unique in that the resultant microcrystalline structure comprises all three, and these crystals have weak intermolecular bonds facilitating rapid transformation from the solid phase to the shear thinning fluid phase with modest shear stresses.

In another aspect, the oil concentration is manipulated to define the solidification temperature of the overall compound so that it is a solid at a temperature of at least 5° C. above the maximum ambient temperature that the chain will experience. Because the operating temperature of the chain is typically less than 5° C. higher than ambient temperature, absent any shear stress the compound will consequently likely remain solid at the chain operating temperature as well.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention.

Figure 1:
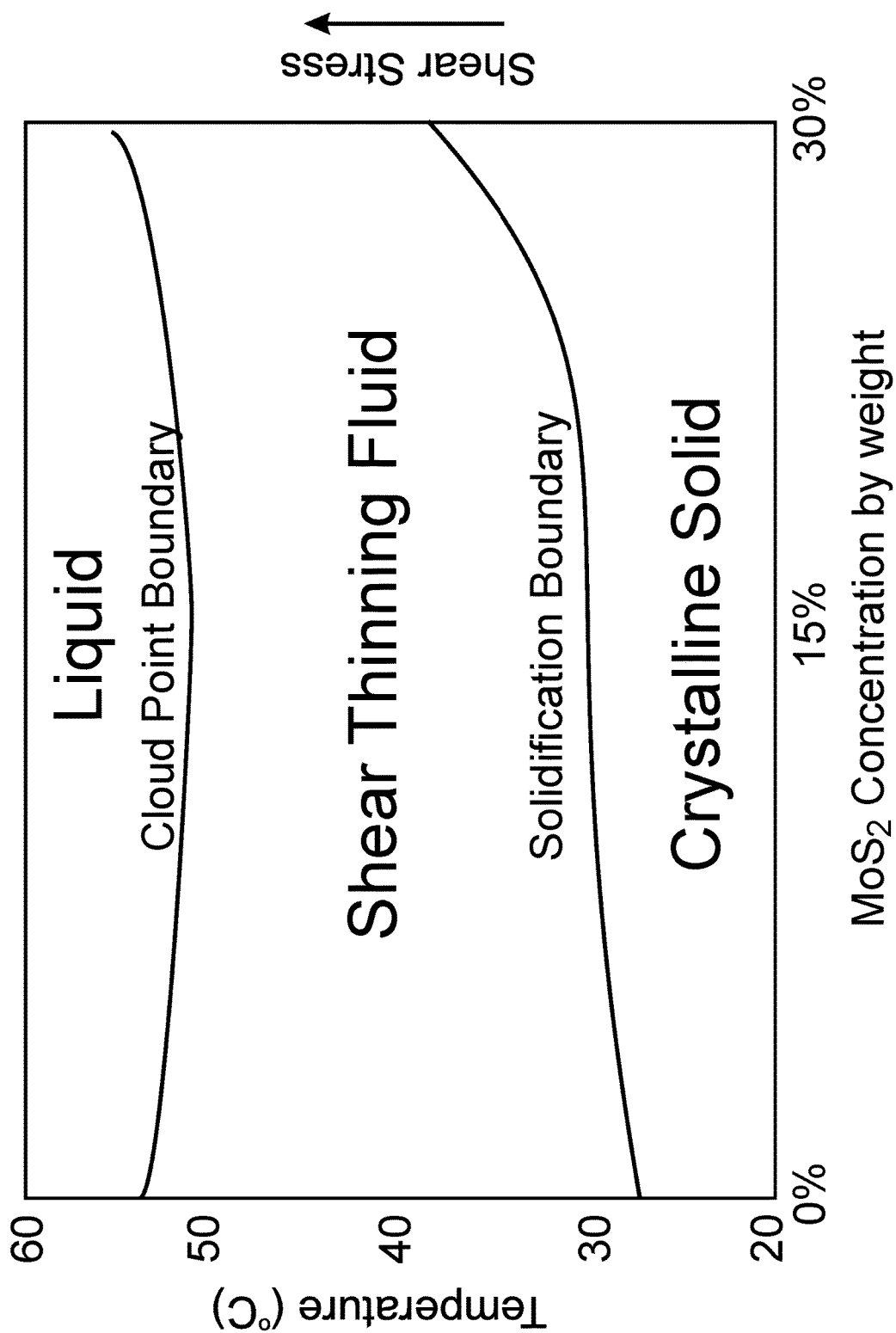
FIG. 1 is a phase diagram for the oil-wax-$MoS_2$ compound, with temperature and shear stress on vertical axes plotted against $MoS_2$ concentration by weight on the horizontal axis. The oil-wax ratios are 20%:65%. The cloud point boundary denotes the phase transition between liquid solution and shear-thinning fluid phase, and the solidification boundary denotes the phase transition between shear-thinning fluid phase and microcrystalline solid.

The inventor has discovered that a mixture of three components: petroleum oil (oil), paraffin wax (wax) and $MoS_2$, form a resultant compound that has three possible phases depending on temperature and pressure; specifically, a crystalline solid, shear thinning gel suspension, or liquid solution, as represented in FIG. 1. It has been observed that the phase transition between the crystalline solid to shear thinning fluid to liquid occurs with increases in shear stress or temperature.

Figure 2:
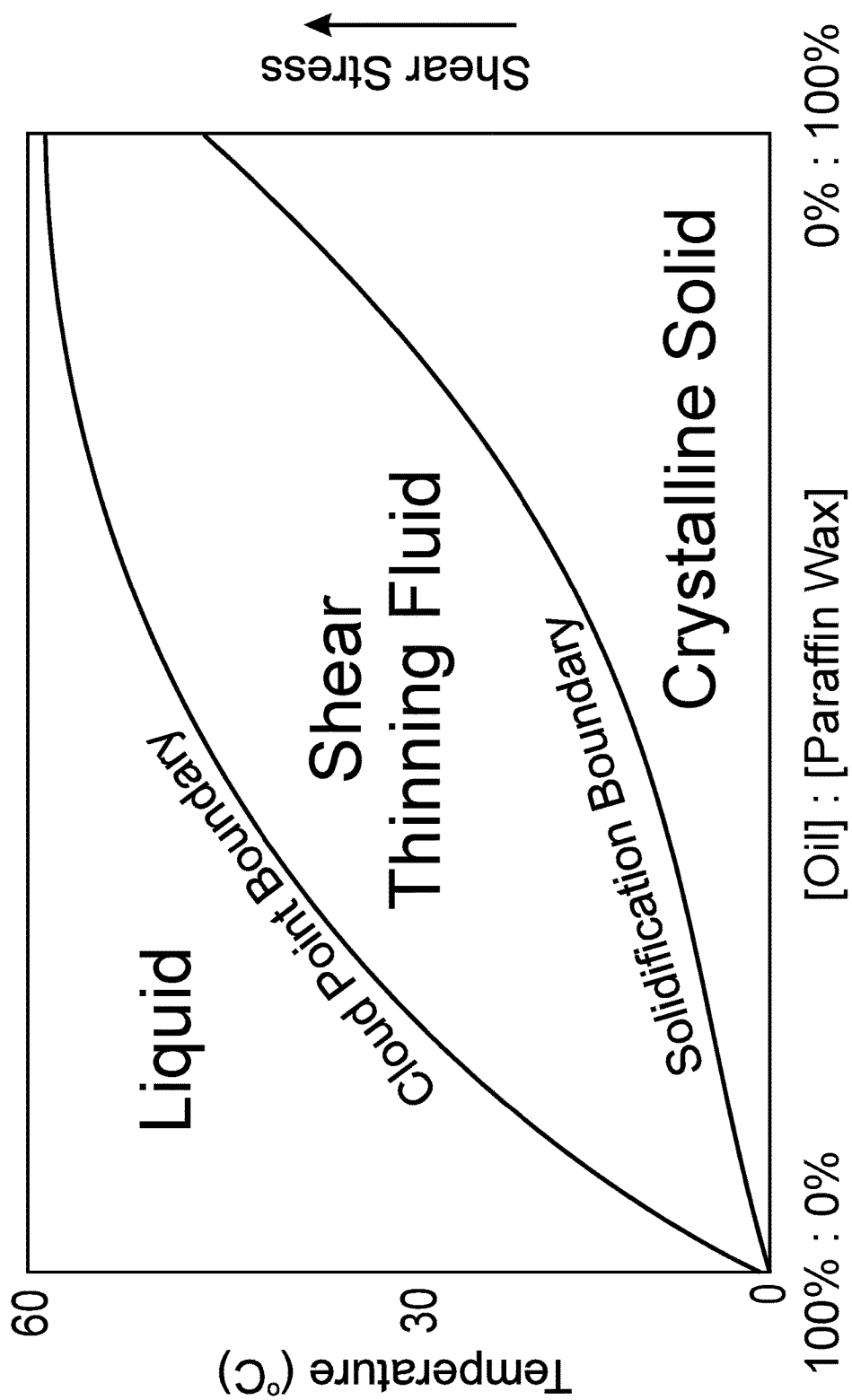
FIG. 2 is a phase diagram for an oil-wax mixture, with temperature and shear stress on vertical axes plotted against the oil to wax ratio on the horizontal axis. Three phases are represented: liquid solution, shear-thinning fluid and crystalline solid.

The compound formulation is designed to be crystalline solid at 5° C. or greater above the maximum ambient temperatures that the chain is expected to experience. The inventor has determined that the ratio of oil to wax by weight changes the solidification temperature. For example, a 1:3 oil-wax compound solidifies at about 25° C., whereas a change in ratios to a 1:7 oil-wax ratio raises the solidification temperature to about 35° C. FIG. 2 reports the temperature and shear stress dependence of phase with respect to the ratio of oil to wax.

At temperatures above 65° C. the oil-wax compound can be regarded as a solution in which the long chain alkanes (wax) are dissolved by the short chain alkanes (oil). It is important to note that below the cloud point temperature the solution becomes saturated and solid crystals precipitate that are a mixture of long and short chain alkanes, this is the beginning of the shear thinning fluid phase. As the temperature is lowered further the size of these crystals grows, increasing the viscosity of the compound. There is not a well-defined boundary from "mushy" low viscosity liquid to a high viscosity semi-solid, both are in the fluid-phase. Once the solidification temperature is reached the compound is a crystalline solid with no diffusion of molecules.

The inventor has examined the oil-wax compound from the perspective of stress at constant ambient temperature. At rest the compound is a crystalline solid. As shear stress is increased above the solidification strain, weak intramolecular and intra-crystalline bonds are readily broken, and viscosity is reduced allowing flow. As the shear increases the large crystals are reduced in size along with a rapid decrease in viscosity. At high strains, the oil-wax compound is a highly lubricious with a shear thinning fluid phase where the crystals are small, eventually beyond the cloud point strain the compound is a liquid solution.

Figure 3:
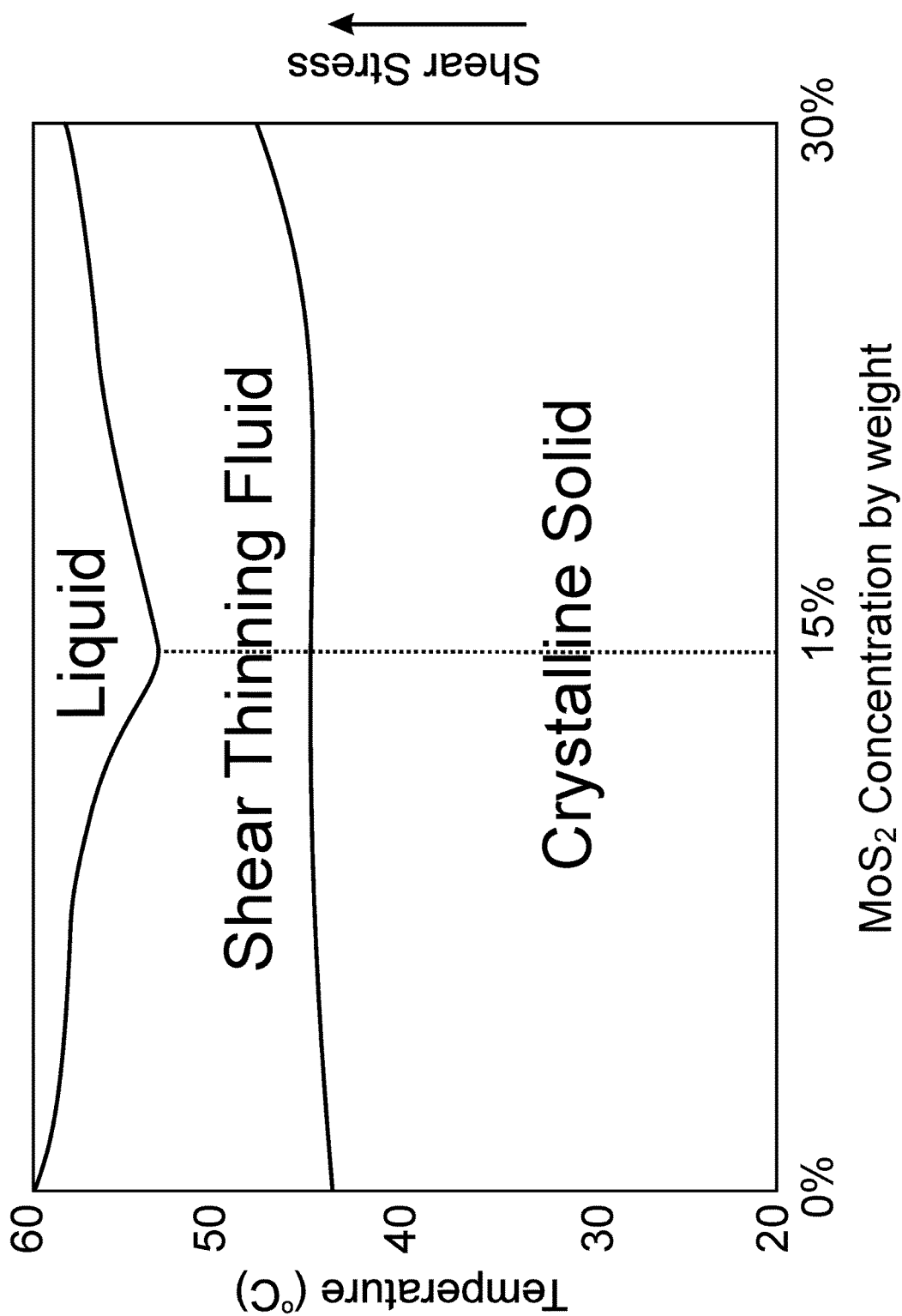
FIG. 3 is a phase diagram for a wax-$MoS_2$ mixture, with no oil present, with temperature and shear stress on vertical axes plotted against $MoS_2$ concentration by weight on the horizontal axis. Three phases are represented: liquid solution, shear-thinning fluid and crystalline solid. The eutectic $MoS_2$ concentration (14%) is denoted by the dashed vertical line.

The inventor investigated many additives to the oil-wax mixture, including powders of graphene, $C_{60}$ buckminsterfullerenes, graphite, PTFE and $MoS_2$. $MoS_2$ was unique in that it bonds at a crystalline level with the wax and oil, whereas the other additives were just impurities remaining chemically distinct. Specifically, $MoS_2$ affected the crystalline composition and physical characteristics of the compound. A mixture of $MoS_2$ with wax (no oil present) revealed a eutectic temperature which was lower than the melting points of $MoS_2$ and wax. The phase diagram is shown in FIG. 3. The inventor also determined the eutectic concentration of $MoS_2$ to be about 14% by weight.

In another aspect, the $MoS_2$ concentration changed the characteristics of the crystals formed in the shear-thinning fluid phase of the oil-wax-$MoS_2$ compound. With a concentration of less than the eutectic concentration, long waxy light grey crystals formed on the surface, whereas above the eutectic concentration the crystals formed were dark grey, small, and dense. As the temperature was decreased the crystals grew in size and number with a corresponding increase in viscosity.

Even in the solid phase there is a difference in the mixture texture below and above the eutectic concentration. Below the eutectic concentration the mixture is a predominantly waxy crystalline solid with some grey coloration and is smooth to the touch. Above the eutectic concentration the structure is believed to be principally dark grey nanoclusters of $MoS_2$ surrounded by wax crystals and is textured (not smooth) to the touch.

In another aspect, the performance of the mixture as a lubricant has been tested over a variety of $MoS_2$ concentrations. The minimal friction performance is in close proximity to the eutectic concentration of $MoS_2$, in the range of 10%-20% $MoS_2$.

The inventor also studied fluorinated hydrocarbon waxes as they have a high melting point because of the stronger intramolecular bonding caused by the fluorine atoms. The fluorinated wax-$MoS_2$ compound has a much smaller temperature and strain range for the shear thinning fluid phase and the solid phase is more brittle and has less adherence to the metal chain. Standard alkane oil-wax-$MoS_2$ had dramatically better performance over the fluorinated hydrocarbon chains which proved to not be durable.

In another aspect, the inventor compared the use of paraffinic oil verses petroleum oil, in the performance of oil-wax-$MoS_2$. Both worked, although the paraffinic oil-wax-$MoS_2$ compound had a more defined boundary at the solidification point, it also was less glossy to the touch and collected less dirt in mountain bike applications. Hence paraffinic oil is preferred.

For application of the oil-wax-$MoS_2$ compound to a bicycle chain the compound is heated to the liquid solution at temperatures above 65° C., allowing the oil, wax and $MoS_2$ component to become a single solution. A clean bicycle chain is then immersed in the solution for several minutes to allow all internal component of the chain to be coated with the solution. The coating process is enhanced with some chain link movement while submersed. The chain is removed from the solution and allowed to cool, drying the coating on the chain. The chain is placed on the bike and ready for use.

The inventor has verified that if the solidification temperature is about 5° C. above the maximum ambient temperature that the chain will experience then the exterior surfaces of the oil, wax and $MoS_2$ coating will be solid during operation of the chain. Dirt, mud, and water that may land on the coated chain does not attach. The coating is also hydrophobic, so water and mud are repelled. As the chain moves, the dirt, mud, and water slide off. The chain performance has low friction as the internal components are lubricated by internal portions of the coating which turn to a lubricous gel under shear stress. Dirt does not gain access to the internal components because of the tight gaps that are mostly filled with the solid coating. Water and mud are repelled again because of the hydrophobic nature of the coating and the shear thinning fluid phase occupies the full internal working space of the chain. At the points of contact between the chain rollers and the sprockets in the drive train there are high shear forces. The coating thins in these areas but the $MoS_2$ is burnished into the chain and the sprocket surfaces creating a dry lubricant for these surfaces.

The inventor notes that utilizing a bike chain with an oil, wax and $MoS_2$ coating as disclosed herein but having a solidification temperature lower than the operating temperature of the chain, for example a solidification temperature of 22° C. in 30° C. ambient temperatures, will result in the entire coating being in the shearing thinning fluid phase including the exterior of the chain. Dirt that comes into contact with the exterior of the chain with a fluid on the surface will attach rather than be shed, just like for an oil-based fluid chain lubricant. The external dirt will be abrasive to the external rollers and sprockets. As such, this is not a preferred embodiment. Such a chain should be cleaned after use just like with use of a fluid lubricant.

A preferred embodiment in elevated temperature is to utilize a chain coating formulated with a higher solidification temperature. For the example with 30° C. ambient temperature, a coating with a solidification temperature of 35° C. or more would be utilized. The oil-wax-$MoS_2$ compound would have an oil composition of 10% or less.

Figure 4:
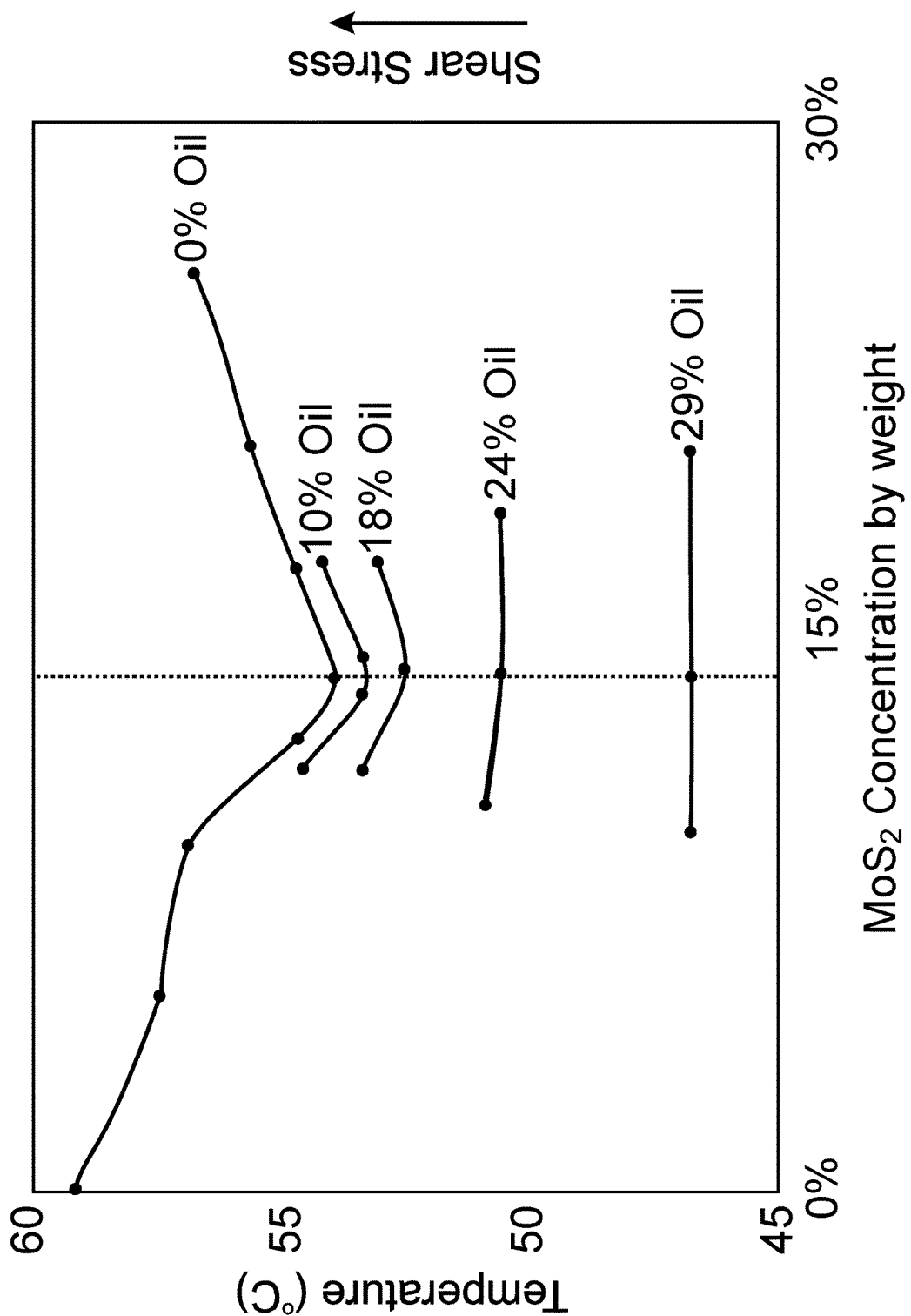
FIG. 4 is a phase diagram for an oil-wax-$MoS_2$ mixture, with temperature and shear stress on vertical axes plotted against $MoS_2$ concentration by weight on the horizontal axis. The cloud point boundary is shown for mixtures having oil content of 0% to 29%. The eutectic $MoS_2$ concentration (14%) is denoted by the dashed vertical line.

In another aspect, in circumstances in which the maximum ambient temperature is about 38° C., 5% or less oil is recommended in the coating compound. The optimal performance with lowest friction was determined to be at the eutectic concentration of $MoS_2$. FIG. 4 reports the temperature dependence of the cloud point around the eutectic point for a variation of oil concentration. As the oil content is increased, there is a decrease in the depth of the temperature dip associated with the eutectic point. When there was 1:2 oil-wax ratio, the cloud point is relative flat. The character of the compound transitioning from waxy to dry crystalline still occurs around the original eutectic point of 14% $MoS_2$.

These three regions were examined by the inventor:

$MoS_2$ (>20%) rich compound has a dull appearance, lumpy texture, on the bike virtually no dirt accumulation on the surface, chain performance was good but about 6% friction loss for over 200 miles. Further, some chain noise could be heard in sideways chain movement suggesting the internal component were not fully lubricated.

$MoS_2$ (<10%) low compound has a shiny-gloss appearance, smooth texture, on the bike dirt attached to the exterior surface, high chain performance with about 3% friction loss, but after about 50 miles of dust trails the loss increased to over 10%.

$MoS_2$ (10-20%) eutectic region is a good balance between the rich and low $MoS_2$ compounds. It has a gun metal satin appearance, smooth texture, on the bike virtually no dirt accumulation on the exterior surface, high chain performance with about 3% friction loss that persisted for several 100 miles.

Table 1 below reports optimal coating compound compositions for different ambient temperature ranges, illustrating the effect of oil content.

TABLE 1

| Maximum Ambient Temperature | Solidification Temperature | Paraffinic Oil | $MoS_2$ | Paraffin Wax |
|---|---|---|---|---|
| <38° C. | >42° C. | ≤5% | 10-20% | ≥75-85% |
| <30° C. | >35° C. | ≤10% | 10-20% | ≥70-80% |
| <20° C. | >25° C. | ≤20% | 10-20% | ≥60-70% |
| <10° C. | >15° C. | ≤30% | 10-20% | ≥50-60% |

Typically, for the oil-paraffin-$MoS_2$ compounds disclosed herein the coating durability on dry road condition is over 1000 miles before the chain needs to be ultrasonically cleaned and the coating reapplied. In wet conditions this is shortened to about 800 miles. In dry mountain biking conditions, the durability is about 500 miles, and again in muddy and wet conditions this is reduced to about 300 miles.

The long-term wear characteristics of the drive train and the chain are incredibly durable, with no drive train wear on road bikes with over 20,000 miles and mountain bikes with 10,000 miles. The chain is still in specification but is replaced after 5,000 miles for the mountain bikes and 10,000 miles for road bikes.

The inventor determined the bike chain power loss for the oil-paraffin-MoS$_2$ compounds to that for standard commercial bike chain lubricants based on light petroleum oil, petroleum jelly, PTFE in solvent, wax in solvent, paraffin wax, PFTE in wax with the latter two being applied in molten form. This was done by measuring for each bike chain lubricant the average power required to maintain 9.0 mph on an incline of 7% for 3 miles. The results are report in Table 2, below. The paraffin wax compounds are the highest performing, with the oil-wax-MoS$_2$ compound being the most efficient.

TABLE 2

| Bike Chain Lubricant | Average Power | Δ Power |
|---|---|---|
| Light Petroleum Oil | 253.4 W | 3.2 W |
| Petroleum Jelly | 253.2 W | 3.0 W |
| PTFE in Solvent | 252.8 W | 2.6 W |
| Wax in Solvent | 252.6 W | 2.4 W |
| Paraffin Wax | 251.0 W | 0.8 W |
| Paraffin Wax + PTFE | 250.8 W | 0.6 W |
| Paraffinic Oil + Paraffin Wax + MoS$_2$ | 250.2 W | 0.0 W |

To put the results of Table 2 in perspective, a benefit of the oil-paraffin-MoS$_2$ lubricant compound over commercial lubricants is increased power to the wheels of up to 3 W. This difference in power could provide the winning benefit of over 30 seconds in a one hour race.

To summarize, the advantages of the oil-paraffin-MoS$_2$ lubricant compound over commercially available lubricants are:

The chain has an external coating that remains solid and repellant to dirt, water and mud.
The internal components of the chain transform the lubricant compound to a lubricous gel under shear stress.
Durable coat that lasts for at least a month of riding, with no maintenance.
Low drivetrain component wear.
Low friction loss for the lifetime of the coating.

This disclosure is illustrative and not limiting, Further modifications will be apparent to one skilled in the art in light of this disclosure and are intended to be fully in the scope of the appended claims.

What is claimed is:

1. A crystalline solid lubricant composition consisting essentially of molybdenum disulphide dispersed in a paraffinic oil-paraffin wax matrix, wherein:
the concentration of paraffin wax is greater than or equal to 50% by weight;
the concentration of paraffinic oil is less than or equal to 30% by weight; and
the concentration of molybdenum disulphide is 10% to 20% by weight.

2. The crystalline solid lubricant composition of claim 1, wherein the concentration of paraffin wax is 50% to 60% by weight.

3. The crystalline solid lubricant composition of claim 1, wherein:
the concentration of paraffin wax is 60% to 70% by weight; and
the concentration of paraffinic oil is less than or equal to 20% by weight.

4. The crystalline solid lubricant composition of claim 1, wherein:
the concentration of paraffin wax is 70% to 80% by weight; and
the concentration of paraffinic oil is less than or equal to 10% by weight.

5. The crystalline solid lubricant composition of claim 1, wherein:
the concentration of paraffin wax is 75% to 85% by weight; and
the concentration of paraffinic oil is less than or equal to 5% by weight.

6. A chain drive component comprising:
a chain; and
the crystalline solid lubricant composition of claim 1 coating the chain.

7. The chain drive component of claim 6, wherein the crystalline solid lubricant composition has a solidification temperature greater than or equal to 15° C. and less than 25° C.

8. The chain drive component of claim 6, wherein the crystalline solid lubricant composition has a solidification temperature greater than or equal to 25° C. and less than 35° C.

9. The chain drive component of claim 6, wherein the crystalline solid lubricant composition has a solidification temperature greater than or equal to 35° C. and less than 42° C.

10. The chain drive component of claim 6, wherein the crystalline solid lubricant composition has a solidification temperature greater than or equal to 42° C.

11. A method of lubricating a bicycle chain, the method comprising:
determining a maximum ambient temperature in which the bicycle is to be operated; and
lubricating the bicycle chain with the crystalline solid lubricant composition of claim 1, wherein the crystalline solid lubricant composition has a solidification temperature 5° C. or more above the maximum ambient temperature.

12. The method of claim 11, wherein the concentration of paraffin wax in the crystalline solid lubricant composition is 50% to 60% by weight.

13. The method of claim 11, wherein:
the concentration of paraffin wax in the crystalline solid lubricant composition is 60% to 70% by weight; and
the concentration of paraffinic oil in the crystalline solid lubricant composition is less than or equal to 20% by weight.

14. The method of claim 11, wherein:
the concentration of paraffin wax in the crystalline solid lubricant composition is 70% to 80% by weight; and
the concentration of paraffinic oil in the crystalline solid lubricant composition is less than or equal to 10% by weight.

15. The method of claim 11, wherein:
the concentration of paraffin wax in the crystalline solid lubricant composition is 75% to 85% by weight; and
the concentration of paraffinic oil in the crystalline solid lubricant composition is less than or equal to 5% by weight.

* * * * *